United States Patent [19]
Lemay et al.

[11] Patent Number: 5,136,500
[45] Date of Patent: Aug. 4, 1992

[54] MULTIPLE SHARED MEMORY ARRANGEMENT WHEREIN MULTIPLE PROCESSORS INDIVIDUALLY AND CONCURRENTLY ACCESS ANY ONE OF PLURAL MEMORIES

[75] Inventors: Richard A. Lemay, Carlisle; Kenneth J. Izbicki, Hudson; David A. Wallace, Chelmsford; William E. Woods, Natick, all of Mass.

[73] Assignee: Honeywell Information Systems Inc., Phoenix, Ariz.

[21] Appl. No.: 366,225

[22] Filed: Jun. 12, 1989

Related U.S. Application Data

[63] Continuation of Ser. No. 19,899, Feb. 27, 1987, abandoned.

[51] Int. Cl.⁵ .................. G06F 12/02; G06F 13/18; G06F 13/36
[52] U.S. Cl. .................. 395/250; 364/243; 364/243.6; 364/245.5; 364/245.7; 364/246; 364/246.5; 364/DIG. 1
[58] Field of Search ... 364/200 MS File, 900 MS File, 364/131–134

[56] References Cited

U.S. PATENT DOCUMENTS

| | | | |
|---|---|---|---|
| 3,761,879 | 9/1973 | Brandsma et al. | 364/200 |
| 4,123,794 | 10/1978 | Matsumoto | 364/101 |
| 4,217,486 | 8/1980 | Tawfik et al. | 371/68 |
| 4,219,873 | 8/1980 | Kober et al. | 364/200 |
| 4,228,496 | 10/1980 | Katzman et al. | 364/200 |
| 4,410,944 | 10/1983 | Kronies | 364/200 |
| 4,484,273 | 11/1984 | Stiffler et al. | 364/200 |
| 4,484,275 | 11/1984 | Katzman et al. | 364/200 |
| 4,493,036 | 1/1985 | Boudreau et al. | 364/200 |
| 4,644,496 | 2/1987 | Andrews | 364/900 |
| 4,672,535 | 6/1987 | Katzman et al. | 364/200 |
| 4,672,537 | 6/1987 | Katzman et al. | 364/200 |
| 4,674,032 | 6/1987 | Michaelson | 364/200 |
| 4,675,811 | 6/1987 | Kishi et al. | 364/200 |
| 4,680,730 | 7/1987 | Omoda et al. | 364/900 |
| 4,719,622 | 1/1988 | Whipple et al. | 370/85 |
| 4,766,536 | 8/1988 | Wilson, Jr. et al. | 364/200 |

FOREIGN PATENT DOCUMENTS

| | | | |
|---|---|---|---|
| 0149355 | 7/1985 | European Pat. Off. | 364/134 |
| 2156554A | 10/1985 | United Kingdom | 364/134 |

Primary Examiner—Archie E. Williams, Jr.
Assistant Examiner—Robert B. Harrell
Attorney, Agent, or Firm—J. S. Solakian; J. H. Phillips

[57] ABSTRACT

A memory controller in which a number of local memories are primarily dedicated to the shared use of a number of local processors of a data processing system to increase the efficiency of use of both the processors and memories. A controller is associated with each local memory to control connection of any one of the local processors to its associated local memory. A local processor can also be connected via a controller and an adapter circuit connected to the controller to a system bus to obtain access to circuits connected thereto. In addition, a system processor connected to the system bus may also be connected to any particular one of the local memories via its associated controller and adapter connected thereto to load data or programs into the local memory for use by the local processors, and to read out the results of previous processing done by the local processors.

11 Claims, 4 Drawing Sheets

| AMP | PIO□ | PII□ | A20□ | REFRESH□ | R/W* | ADD** | NON MEM△ | OUTPUT SIGNAL |
|---|---|---|---|---|---|---|---|---|
| 26 | 1 | 0 | 0 | 0 | 1 | 1 | 0 | CS1 |
| 27 | 1 | 0 | 0 | 0 | 0 | 1 | 0 | CS2 |
| 28 | 1 | 0 | 0 | 0 | 1 | 0 | 1 | CS5 |
| 29 | - | - | 1 | 0 | 1 | - | - | CS6 |
| 30 | - | - | 1 | 0 | 1 | 1 | - | CS7 |
| 31 | - | - | 1 | 0 | 0 | 1 | 0 | CS8 |
| 32 | - | 1 | 0 | 0 | 0 | 1 | 0 | CS4 |
| 33 | 0 | 1 | 0 | 0 | 1 | 1 | 0 | CS5 |
|    | - | - | - | 1 | - | - | - | REFRESH |

- — DON'T CARE
- \* WRITE = 1, READ = 0
- \*\* ADDRESS OK = 1, ADDRESS OUT OF RANGE = 0
- △ EXTERNAL MEMORY OPERATION = 1
  LOCAL MEMORY OPERATION = 0
- □ REQUEST FROM CIRCUIT = 1

FIG. 5

MULTIPLE SHARED MEMORY ARRANGEMENT WHEREIN MULTIPLE PROCESSORS INDIVIDUALLY AND CONCURRENTLY ACCESS ANY ONE OF PLURAL MEMORIES

This is a continuation of co-pending application Ser. No. 07/019,899 filed on Feb. 27, 1987, now abandoned.

BACKGROUND OF THE INVENTION

1. Field of the Invention

This invention relates to data processing systems and more particularly to logic for allowing a plurality of processors to share a plurality of memories primarily used by the processors.

2. Description of the Related Art

In the prior art, memory access arrangements are taught but they all have shortcomings. In one arrangement, a single memory is dedicated to and accessed by a single processor. While this speeds read/write access time by the processor to its dedicated memory, the efficiency of use of the memory is low. For systems having more than one processor, other memories must also be provided, and each processor is limited to accessing only its own memory. This requires much memory and is expensive.

Another approach is to have one common memory connected to a bus and the memory is accessed by two or more processors. While less memory needs to be provided, and efficiency of use of the common memory increases, very often more than one processor wants to access the common memory at the same time. This causes one or more of the processors to wait which decreases their efficiency of use. To overcome this problem cache memories are provided for each processor, as is known in the art, but this increases both circuit complexity and cost.

Accordingly, there is a need in the art for a multiple processor, multiple shared memory arrangement wherein each of the processors can access any one of the memories without preventing another processor from accessing another of the memories at the same time.

SUMMARY OF THE INVENTION

The needs of the prior art are met by the present invention which provides a multiple shared memory arrangement wherein multiple processors can individually and concurrently access any one of the memories. This operation maximizes processor and memory use and efficiency and each processor has access to all of the shared memories even if not to all of them at the same time.

Each of the shared memories has a memory controller associated with it and there is a switch arrangement between the processors and the memory controllers. The switch arrangement permits concurrent access between any one of the processors and any one of the memory controllers. The one limitation is that two processors cannot access the same memory at the same time. A processor that is connected to a particular memory controller is then connected via the switching arrangement to a memory associated with the particular controller. Read and write operations from and to the memory associated with each controller are accomplished in a manner known in the art.

Each memory controller may be alternatively connected via the associated adaptor circuit to the system bus on which they may read or write the other storage circuits in a manner well known in the art. Any one of the multiple processors connected to any one of the memory controllers may request and be alternately connected via an associated adapter circuit to the system bus on which they may read or write the other storage circuits in a manner well known in the art. System processors may access any one of the multiple processors via the adapter circuits. In addition, any one of the system processors connected to the system bus may request and be alternatively connected via any one of the adapter circuits to a memory controller and its associated memory.

BRIEF DESCRIPTION OF THE DRAWING

The invention will be better understood upon reading the following detailed description in conjunction with the drawing in which:

FIG. 5 is a table showing the correlation between input signals and output signals that can be used to program a programmable arithmetic logic circuit in the control signal generator.

DESCRIPTIONS OF THE PREFERRED EMBODIMENT

Figure 1:
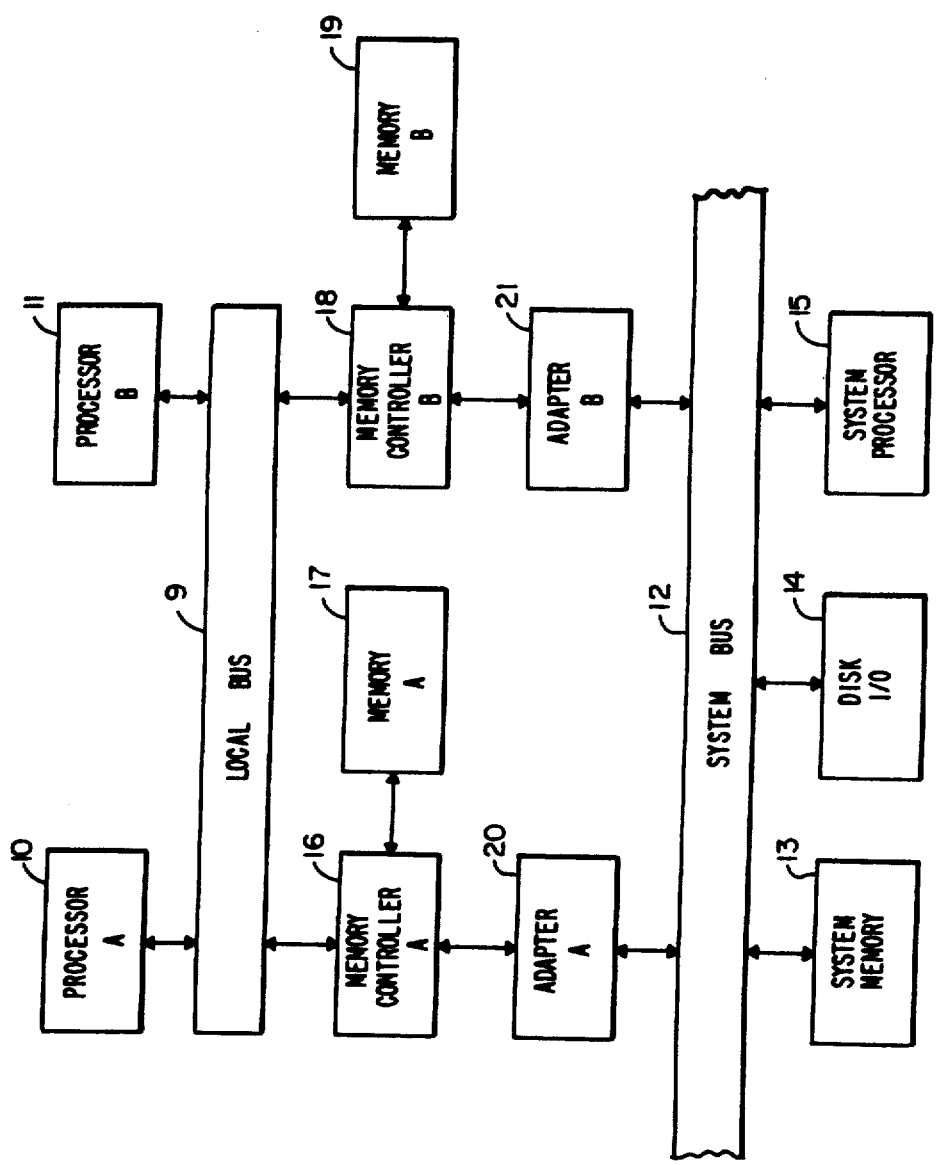
FIG. 1 is a block diagram of a portion of a computer system showing how the present invention connects thereto.

In FIG. 1 is shown a block diagram of a portion of a computer system in which the shared memory controller arrangement is utilized. Standard computer system elements are processor 10, processor 11, system bus 12, system memory 13, disk input/output device 14 and system processor 15. In the prior art processors 10 and 11 would normally be connected to system bus 12 along with system processor 15 and they would cooperate in a multiprocessing arrangement to process application programs, with processor 15 being a master processor, in a well known manner.

In accordance with the teaching of the present invention the two local memories 17 and 19 are dedicated to the joint use of application-program processors 10 and 11 to increase their operating efficiency, and to increase the efficiency of use of memories 17 and 19. Memories 17 and 19 are respectively associated with local memory controller 16 and local memory controller 18 which control access to the memories. Local processors 10 and 11 are not connected directly to system bus 12, but rather are connected to a local bus 9. Memories 17 and 19 are also not connected to the system bus 12. Also connected to local bus 9 are the memory controllers 16 and 18. Memory controllers 16 and 18 primarily permit shared access to their respective associated memories 17 and 19 by either processor 10 or processor 11. In this manner the chances of either processors 10 or 11 having to wait to gain access to a memory are statistically decreased compared to one memory serving both processors.

Memories 17 and 19 may also be accessed from system bus 12 via adapters 20 and 21 respectively to load application programs and data to be processed into these memories for subsequent use by processors 10 and 11. Similarly, memories 17 and 19 may be read out to circuits connected to system bus 12.

Figure 2:
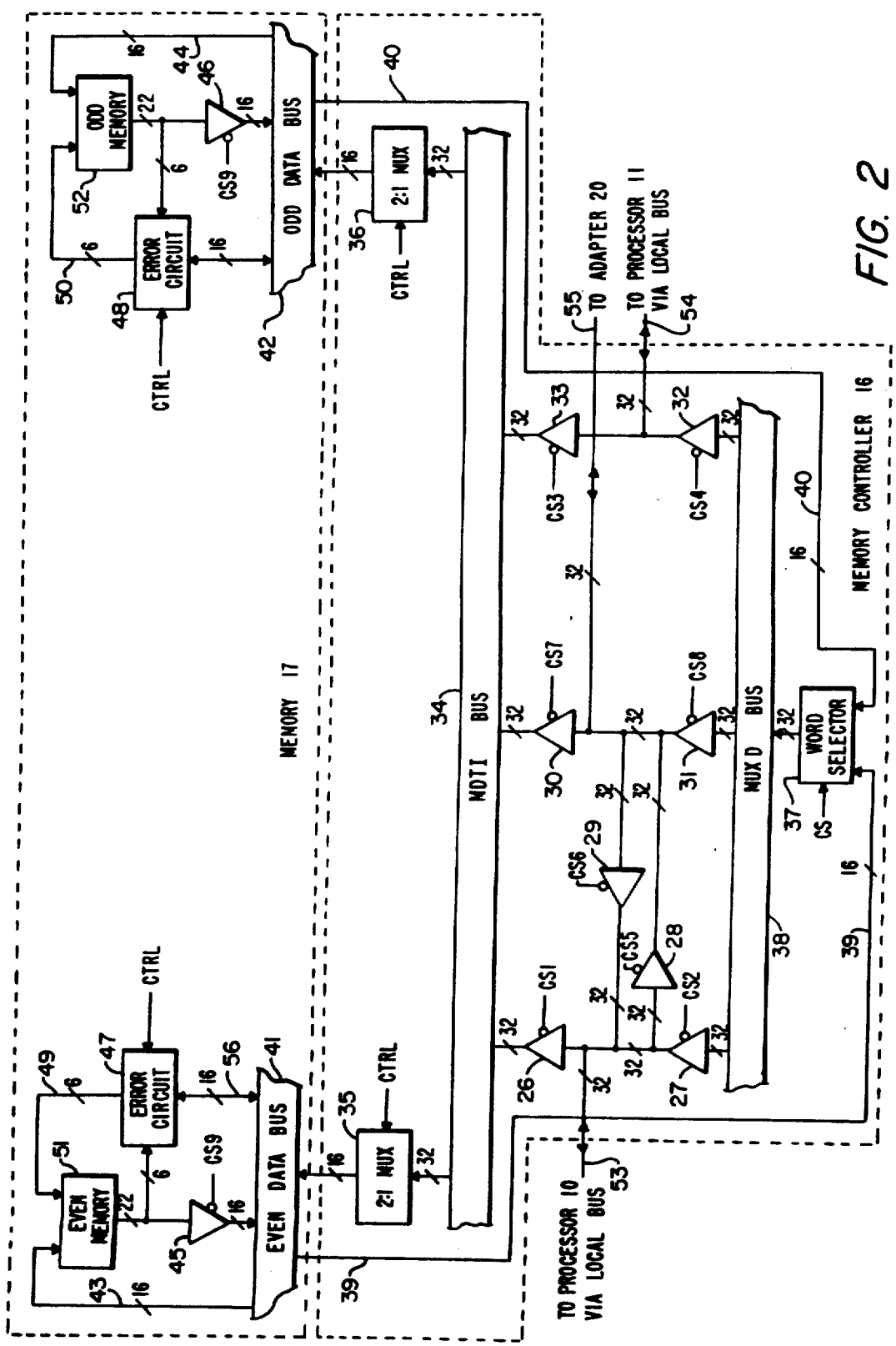
FIG. 2 is a detailed block diagram schematic of a memory controller and memory.

In addition, processors 10 and 11 each have access via memory controllers 16 and 18 and adapter circuits 20 and 21 respectively connected thereto to system bus 12 to gain access to other storage circuits connected thereto such as system memory 13 and disk I/O 14. The circuit details of an exemplary memory controller 16 and a memory 17 are shown in FIG. 2 which is described further in this specification.

There are four basic types (A, B, C and D) of memory read and write, or memory, transactions that can be performed by the invention working in the system configuration shown in block diagram form in FIG. 1. In memory transaction type A local processor 10 may read or write to local memory 17 associated with local memory controller 16, local processor 11 may read or write to local memory 19 associated with local memory controller 18, processor 10 may read or write to memory 19 associated with memory controller 18, and processor 11 may read or write to memory 17 associated with memory controller 16. Access between processors 10 and 11 and memory controllers 16 and 18 for these type A transactions is via local bus 9 and switches that are part of memory controllers 16 and 18 and shown in FIG. 2. These type A transactions never access other storage circuits connected to system bus 12.

There are also type B transactions wherein some circuits connected to system bus 12, such as system processor 15, may request and gain access to memories 17 and 19 to write programs or data therein for use by processors 10 and 11, or to read processed data from these memories. A type B transaction request to access memory 17 associated with memory controller 16 is always made via (recognized by) system adapter 20, and a request to access memory 19 associated with memory controller 18 is always made via (recognized by) adapter 21.

With type C transactions, processors 10 or 11 can read or write system memory 13 or other circuits connected to system bus 12. To implement this type of transaction processor 10 must access only memory controller 16, and processor 11 must access only memory controller 18. When memory controller 16 is seized by processor 10, controller 16 determines if a memory or non-memory address received from processor 10 is to memory 17 and further determines if memory 17 is to be accessed. Upon determining that memory 17 is not to be accessed, memory controller 16 forwards the read or write request via adapter 20 to system bus 12. After memory controller 16 passes a read request to adapter 20 to be placed on system bus 12, memory controller 16 is not free to service other read or write requests until the read operation to, for example, system memory 13 is completed. Write operations to, for example, system memory 13 are considered completed as soon as the request, address and data are passed to adapter 20, and memory controller 16 can then process other read or write requests from either processor 10 or 11. When the type C transaction request is a read operation, the program or data will be returned, and can only be returned over the same path that the request is made on. In addition, when adapter 20 receives the returned program or data it must make an access request to memory controller 16. That request is granted an appropriate connection is established through memory controller 16 and adapter 20 returns the data or program to processor 10. Thereafter, processor 10 is again free to request memory read or write operations from controllers 16 or 18. Similarly, processor 11 can access system memory 13 or other system circuits via its associated memory controller 18 and adapter 21.

The D type transaction is a lock cycle transaction wherein, for example, processor 10 can perform a read lock of either memory 17 or memory 19, but the read operation is not done directly through memory controller 16. The lock operation, when called for, assures that the addressed memory from one processor will not acknowledge a bus cycle initiated by another processor until the first processor operation is completed. Assuming processor 10 wants to do a read lock on memory 17, the address and read request sent to memory controller 16 is not used to read memory 17, but instead is passed to adapter 20. Adaptor 20 places the read request and address on system bus 12 and then recognizes that the address is to memory 17. Adapter 20 answers the request it just placed on bus 12 and receives the read request and address. Then adapter 20 makes a request for connection to memory controller 16 and memory 17. When that request is granted, reading of memory 17 takes place. The information read out of memory 17 is returned to adaptor 20 rather than to processor 10. Adapter 20 takes the information read out of memory 17 and destination and places it on system bus 12. Adapter 20 then recognizes that the information it just placed on bus 12 is for processor 10 and re-captures the information. Adapter 20 again makes a request for use of controller 16. When this request is granted, adapter 20 returns the information via memory controller 16 and local bus 9 to processor 10.

Similarly, if processor 10 requests a read lock operation to memory 19, the read request and address are passed via memory controller 16 and adapter 20 to system bus 12 as described in the last paragraph. However, adapter 21 recognizes that the read request is for memory 19 and takes the request and address from system bus 12. Adapter 21 makes a request to memory controller 18 to read memory 19, and when the request is granted memory 19 is read. Like the read lock operation described in the last paragraph, the information read out of memory 19 is returned through memory controller 18 and adapter 21 to system bus 12. Adapter 20 recognizes that the information on system bus 12 is for processor 10 and stores the information. Adapter 20 then makes a request for use of memory controller 16. When this request is granted, adapter returns the information via controller 16 and local bus 9 to processor 10.

While the type D read lock operation described in the last two paragraphs is initiated by processor 10 to either memory 17 or memory 19, processor 11 can also request read lock operation to memories 17 and 19 and the operation is the same as that described in the last two paragraphs. Furthermore, since the lock request is placed on system bus 12, a lock request of system memory 13 is performed in a manner transparent to processor 10.

In FIG. 2 is shown a detailed block diagram schematic of a memory controller 16 and an associated memory 17. Since controller 16 with memory 17 is the same as memory controller 18 with memory 19, only the schematic of memory controller 16 and memory 17 are shown in FIG. 2 and are described hereinafter.

Around the edges of the portion of FIG. 2 identified as memory controller 16 are shown three input/output connections to processor 10, to processor 11, and to adapter 20 which are shown in FIG. 1. Each of these three connections can carry information in both directions as previously described with reference to FIG. 1. In addition, the connections between controller 16 and associated memory 17 are shown. The three connections identified in the beginning of this paragraph are all connected to a switching network implemented with buffer amplifiers 26 through 33. The data paths within memory controller 16 are mostly thirty-two bit paths as indicated by the slash mark and the number thirty-two adjacent thereto. Accordingly, amplifiers 26 through 33 each respectively represent thirty-two amplifiers. Each of the two-hundred fifty-six individual amplifiers represented by amplifiers 26 through 33 are a 74S241 Tri-State Octal Amplifier operated as a buffer driver in a manner well known in the art. They are available from Texas Instruments and other sources.

The other circuits within memory controller 16 are word selector 37 which has two sixteen bit inputs and a thirty-two bit output. Word selector 37 is made up of eight Quad 2:1 Multiplexer chips designated 74AS157 which are also available from Texas Instruments and other sources. Each of these chips is a four pole double throw switch. Word selector 37 is used to reverse or transpose the two groups of sixteen input bits at the output. That is, the sixteen bits at the input from path 39 may be either the lower order sixteen bits or the higher order sixteen bits of the thirty-two bit output from translator 37. Similarly, the sixteen bits at the input of translator 37 from path 40 will be the remaining sixteen of the thirty-two bits output from translator 37. More detail of how this is accomplished is described further in this specification. Circuitry analogous to buffer amplifiers 26 through 33 provide paths for thirty-two address bits to/from processor 10, processor 11 or adapter 20.

At the output of memory controller 16 to memory 17 are two 2:1 multiplexers 35 and 36. Multiplexers 35 and 36 are each made up of a number of 74AS257 multiplexers having tri-state outputs. That is, the output may be high, low or open. Each of multiplexers 35 and 36 have thirty-two input bits and sixteen output bits. These 2:1 multiplexers 35 and 36 are used to selectively choose which of the higher order sixteen bits or lower order sixteen bits are to be applied to the even memory 51 and odd memory 52 in memory 17. In an alternative embodiment of the invention memory 17 may be a single memory instead of two smaller memories.

In the following paragraphs are described the routing of data words within memory controller 16. The described operations are the type A-D transactions mentioned previously. After the routing of the data is described, the generation of the CS control signals used to operate the buffer amplifier switches within memory controller 16 is described with reference to FIGS. 3, 4 and 5.

When processor 10 requests and gains access to memory controller 16 for a read operation from memory 17, an address is sent that is first checked. If the address is not in the address range of memory 17, or is used in a lock operation, read access is not granted. Otherwise, read access is granted. In response thereto a thirty-two bit word is read out of memory 17 and input to memory controller 16 as sixteen bits on path 39 to one input of word selector 37 and sixteen bits on path 40 to the other input of word selector 37. In response to a control signal CS input to word selector 37 the two sets of sixteen input bits are selectively connected to the higher order or lower order sixteen-bits of the thirty-two bit output from word selector 37.

The output from word selector 37 is connected to a thirty-two bit MUXD bus 38 to which also are connected the inputs of buffer amplifier switches 27, 31 and 32. For the read operation from memory 17 a control signal CS2 is generated which operates the thirty-two individual amplifiers making up buffer amplifier 27. This connects the thirty-two bit word read from memory 17 to input/output path 53 to be returned to processor 10.

Alternatively, if processor 10 is writing to memory 17, a thirty-two bit word is presented on input/output path 53. A control signal CS1 is generated which operates the thirty-two individual amplifiers making up buffer amplifier 26. Thus, the thirty-bit word on input/output path 53 is connected to MDTI bus 34. Multiplexers 35 and 36 have their inputs connected to MDTI bus 34 and control signals are applied to them to select which of the higher order and lower order sixteen-bits of the thirty-two bit word on bus 34 will pass through 2:1 multiplexers 35 and 36 and be stored in even memory 51 and odd memory 52 of memory 17.

In an operation where processor 11 requests and gains access to memory controller 16 to read from memory 17, the thirty-two bit word read out of memory 17 appears as sixteen-bits on path 39 and sixteen-bits on path 40. As described above these two sets of sixteen bits are selectively transposed by word selector 37 and are present on MUXD bus 38. A control signal CS4 is generated which operates each of the thirty-two amplifiers making up buffer amplifier 32 to connect the thirty-two bit word read out of memory 17 to input/output 54 path and on to processor 11.

If instead processor 11 is writing to memory 17, after the processor requests and gains access to memory controller 16, a control signal CS3 is generated which operates each of the individual amplifiers comprising buffer amplifier 33 and connects the thirty-two bit word to be written into memory 17 to MDTI bus 34. As previously described other control signals operate 2:1 multiplexers 35 and 36 to selectively apply the higher order and lower order sixteen-bits of the word to be stored to even memory 57 and odd memory 52 of memory 17.

In a type B transaction a circuit connected to system bus 12, such as system processor 15 or system memory 13, requests access to memory 17 to either read data from this memory, or to store other data or programs in this memory for use by processor 10 in future processing. When system processor 15 wants to write into memory 17, it first gains access to adapter 16 or 18 and transmits to it information to be written and an address in memory 17. Adapter 20 in turn requests access to memory controller 16 to write into memory 17. When this request is granted, a control signal CS7 is generated which operates the thirty-two amplifiers making up buffer amplifier 30. A thirty-two bit word from adapter 20 present on input/output path 55 is thereby connected to MDTI bus 34. As previously described 2:1 multiplexers 35 and 36 are operated to selectively place the higher order and lower order sixteen bits of the thirty-two bit word from adapter 20 into even memory 51 and odd memory 52.

To read memory 17 to adapter 20 and thence to a circuit connected to system bus 12, memory 17 is addressed and read out via paths 39 and 40, and word selector 37 to MUXD bus 38. Control signal CS8 is generated that enables the thirty-two amplifiers making up amplifier 31 to connect the thirty-two bit word read out to input/output 55 path and via adapter 20 to system bus 12.

In an operation where processor 10 requests and gains access to memory controller 16 to be connected via adapter 20 and system bus 12 to other storage circuits, such as system memory 13, different control signals are generated. When this type C transaction is a write operation, control signal CS5 operates buffer amplifiers 28, and the data word present at input/output 53 is passed through to input/output path 55 and to adapter 20. As previously described adapter 20 will gain access to system bus 12 and will store the data word from processor 10 in the requested storage circuit.

In a type C transaction where processor 10 is reading from a storage circuit, such as system memory 13 connected to system bus 12, processor 10 first requests and then gains access to memory controller 16. The connection to adapter 20 is the same as described in the last paragraph and the read request and address are passed to adapter 20. The connection between processor 10 and memory controller 16 is then broken. As previously described, controller 16 can now handle read/write requests from processor 11, but processor 10 cannot request any other read or write operations with controller 16, or controller 18 until the present read operation from a system storage circuit on system bus 12 is completed.

When the read operation requested by processor 10 has been accomplished by adapter 20, this adapter makes a request for access to memory controller 16 and indicates that it needs a connection to processor 10. When the access request by adapter 20 is granted, a control signal CS6 operates buffer amplifiers 29. This passes a data word on input/output path 55 from adapter 20 directly to input/output path 53 and thence to processor 10.

Type C transactions involving processor 11 are not handled by controller 16; instead, processor 11 uses controller 18 to access adapter 21. The details of such type C transactions involving processor 11 are identical (except for the designations) to those outlined in the previous two paragraphs.

Thirty-two bit word memory 17 is made up of two sixteen-bit memories 51 and 52 in the preferred embodiment of the invention. However, a single thirty-two bit word memory may also be used with minor changes in the error circuit which is well known in the art. Memory 51 is the even memory and memory 52 is the odd memory as described previously. Data or program instructions to be stored in even memory 51 are switched through memory controller 16 to even data bus 41, and then over path 43 to the input of even memory 51. Memory 51 also has an address applied thereto and a read/write indication that are not shown but which are well known in the art. The operation of memory 51 in response to such signals is also well known in the art. When memory 51 is being read rather than written, there is no data on path 43.

Information read out of even memory 51 is twenty-two bits wide, sixteen bits of which are the information of interest, and six bits of which are an error correction code. The sixteen information bits read out of even memory 51 are connected to the inputs of buffer amplifier 45. Amplifier 45 is made up of sixteen individual amplifiers, and are implemented with Fairchild 74F373 Tri-State Octal Registers operating as buffer amplifiers. Buffer amplifier 45 is controlled by control signal CS9, which is generated and applied to amplifier 45 only when even memory 51 is read out.

The six error correction bits read out of even memory 51 during a memory read operation are input to error circuit 47. The sixteen information bits read out of even memory 51 are switched through buffer amplifier 45 to even data bus 41 and are input via path 56 to error circuit 47. This makeup of sixteen information bits and six error correction bits is a standard 16/6 Hamming code that is well known in the art. Error circuit 47 is an AMD2960 error correction and detection chip available from American Micro-Devices, and is operated in a standard manner. Error circuit 47 processes the sixteen bit data word present at its input to check for and correct errors in the sixteen bits, if at all possible. The checked and/or corrected sixteen bit information word is output from error circuit 47 back onto path 56 to even data bus 41. This information word then flows from bus 41 onto path 39 back into memory controller 16 to word selector 37 as previously described.

While the memory circuit operation described in the previous paragraphs is for even memory 51, the same described operation applies to odd memory 52. Accordingly, the operation is not again repeated with reference to odd memory 52.

Figure 3:
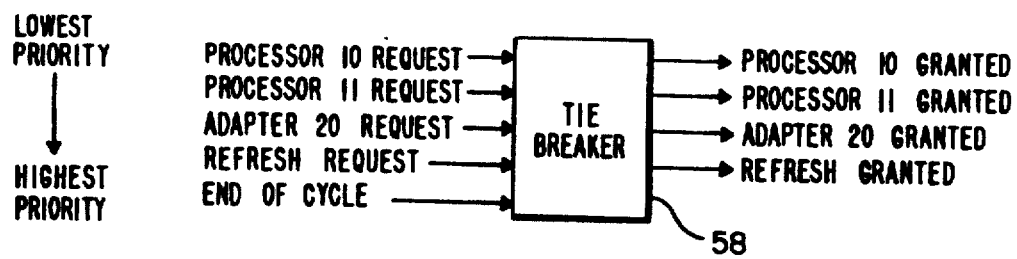
FIG. 3 is a representation of a tie breaker circuit deciding access to a memory controller from competing circuits.

In FIG. 3 is shown a simple block diagram of a tie breaker circuit 58. There are two tie breaker circuits, one associated with each of memory controllers 16 and 18. Tie breaker circuit 58 shown in FIG. 3 is associated with processor 10. That is, in FIG. 3 the lowest priority request is from processor 10, but in the second tie breaker circuit (not shown) the lowest priority request is from processor 11. In addition, the A and B suffixes on the A and B request and grant signals are reversed. That is, for example, an Adapter A request becomes an Adapter B request. Tie breaker circuit 58 is well known in the art and is taught in U.S. Pat. No. 4,493,036, having the same assignee as the present invention. The material in this earlier patent is not repeated herein to avoid detracting from the present invention, and because it does not form part of the invention.

The description of the tie breaker circuit 58 shown in FIG. 3 is made with this circuit being assigned to grant requests for access to memory controller 16. There are four request inputs to tie breaker 58. They are a P10 request from processor 10, a P11 request from processor 11, an Adapter A request from adapter 20, and a Refresh request. Even though circuit 58 is associated with processor 10, processor 10 is assigned the lowest priority access to memory controller 16. The highest priority is assigned to the Refresh request. Memory 17 is an NMOS memory, well known in the art, and in operation charge slowly leaks off and must be replaced or refreshed or the contents of memory 17 are lost. Since it cannot be permitted to lose the contents of memory 17, its contents are periodically refreshed. A memory refresh circuit is not shown or described since they are well known in the art, but a refresh request from same receives the highest priority to access memory controller 16 and refresh memory 17.

Adapter 20 is assigned the second highest priority to access memory controller 16. This higher priority is assigned because on a relative basis adapter 20 is seldom requesting access to memory controller 16, but when it does it needs priority access to place programs or data in memory 17 for use primarily by processor 10, or to read the results of previous processing from memory 17.

Similarly, processor 11 seldom requests access to memory controller 16 when compared to access by processor 10 so it has been given a higher priority than processor 10.

In operation of tie breaker 58, when memory controller 16 is idle the first of the four requests to appear at the inputs of circuit 58 is immediately granted. However, if two requests from a first and a second circuit appear simultaneously, the request from the circuit having the higher priority is first granted access to memory controller 16. When the first circuit to which the access has been granted is finished with a read or write operation the request from the second circuit is granted. If while the first circuit has access to memory controller 16 a third circuit requests access to controller 16, tie breaker circuit 58 will then select between the second and third circuits requesting access and the one of these two circuits having the higher priority will be granted access to memory controller 16 following the first circuit.

There is also an End of Cycle input to tie breaker circuit 58 which has a signal from a system clock or timing circuit, not shown but well known in the art, which indicates the end of the current memory controller cycle. This timing signal restarts circuit 58 to make another decision and grant access to memory controller 16 if any requests are awaiting service.

Whichever access requesting circuit is granted access to memory controller 16 by tie breaker circuit 58, it has its associated Request Granted output lead go high. For example, if processor 10 requests connection to memory controller 16 and the request is granted, the Processor 10 Granted output from tie breaker circuit 58 goes high. The request granted outputs from tie breaker circuit 58 are input to a control signal generator circuit shown in FIG. 4. Although not specifically shown in FIG. 3, the request granted outputs from tie breaker circuit 58 are also connected back to their respective access requesting circuits so that the requesting circuits receive an indication when their request is granted and they are connected to memory controller 16.

Figure 4:
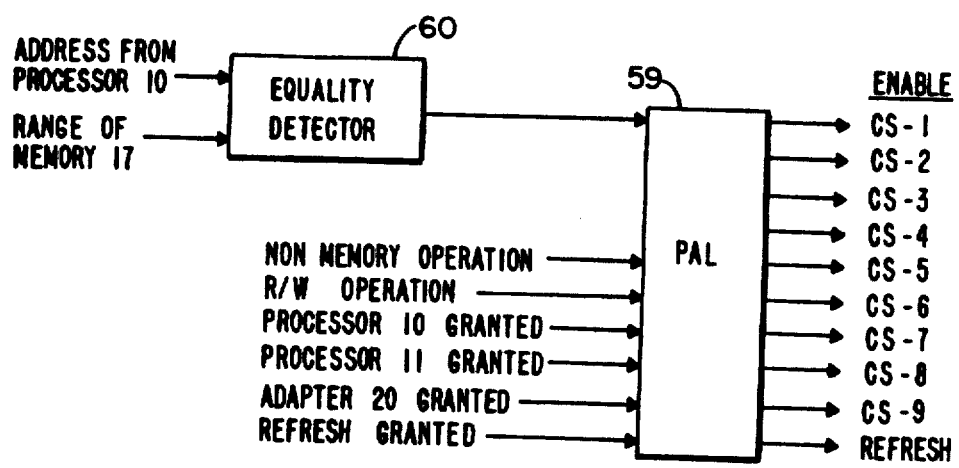
FIG. 4 is a block diagram of a control signal generator used to control operations in a memory controller.

In FIG. 4 is shown the control signal generator circuit which responds to the access granted signals output from tie breaker circuit 58 to generate CS control signals that operate the switching buffer amplifiers shown in FIG. 2 and described previously in this specification. There is a control signal generator circuit associated with each memory controller, and the circuit shown in FIG. 4 is associated with memory controller 16. The control signal generator comprises an equality detector 60 and a programmable array logic (PAL) circuit 59. In addition to the inputs from tie breaker circuit 58, there is also a R/W operation input on which is a signal indicating if a read or a write operation is to performed on memory 17 or another storage device connected to system bus 12 in FIG. 1. There is also a Non-Memory Operation input that indicates if the requested read or write operation involves memory 17 or one of the other system storage devices. Finally, there is a valid address input from equality detector 60 that indicates if the memory address forwarded to memory controller 16 can be used to address memory 17. Path selection in memory controller 16 is by means of CS enable signals generated by circuit 59.

More specifically, equality detector 60 is a 74F521 equality detector comparator available from Fairchild Semiconductor. The PAL is available from numerous sources and is programmed to provide outputs for specified input signal combinations in a manner well known in the art. The input and output signal relations are shown in FIG. 5 and permit programming of PAL 59 to implement the control signal generator. One input to detector 60 is the memory address from processor 10. The other input to detector 60 indicates the range of addresses that can be addressed in memory 17 and can be supplied by settings on DIP switches as is well known in the computer art. Detector 60 compares an address from processor 10 with the range of addresses of memory 17. If the address from processor 10 is within range, there is an appropriate output from detector 60 indicating same.

However, an output from detector 60 indicating that the address is in range or valid doesn't alone mean a read or write operation will be performed with memory 17. The address may also be valid for a storage device such as Disk I/O 14 connected to system bus 12 in FIG. 1. Accordingly, the control signal generator also needs another input indicating if the requested read or write operation is to involve memory 17. The other input is the Non Memory Operation input which has an indication thereon only if the read or write operation involves memory 17. The lack of an indication on the Non Memory Operation input or the lack of an Address OK signal from detector 60 indicates that the requested operation is to another storage device connected to system bus 12.

When processor 11 requests and receives access to memory controller 16, the address it forwards is not checked because processor 11 can never establish a connection through memory controller 16 and adapter 20 to perform a read or write operation involving a storage device connected to system bus 12.

In FIG. 5 is shown a logic table showing the state of inputs to the control signal generator (PAL) 59 to get the indicated CS control signals that are used to operate the switching buffer amplifiers shown in FIG. 2. This information enables one skilled in the art to program PAL 59.

While what has been described hereinabove is the preferred embodiment of the invention, it should be understood that numerous changes may be made without departing from the spirit or scope of the invention. For example, memory 17 may be a single memory rather than the even or odd memories disclosed. In addition, the number of processors, memory controllers and memories may be increased.

What is claimed is:

1. A data processing system comprising:
   only one system bus for transmitting signals applied to the system bus to other means connected to the system bus;
   system processor means connected to the system bus for applying memory access request signals to the system bus, the memory access request signals including an address of a memory means, the addressed memory means, and a request that the addressed memory means execute a requested memory transaction;
   system memory means having an address connected to the system bus for executing a memory transaction upon receiving from the system bus memory access request signals including the address of the system memory means and signals identifying a requested memory transaction to be executed by the system memory means;
   a local bus for transmitting signals applied to the local bus to other local means connected to the local bus;

a plurality of local processor means connected to the local bus, each one of the local processor means applying to the local bus memory access request signals;

a plurality of local memory controller means connected to the local bus;

a plurality of local memory means, each one of the plurality of local memory means having an address and being connected to a different one of the plurality of local memory controller means;

a plurality of adapter means, each one of the plurality of adapter means being connected to different one of the plurality of local memory controller means, and each one of the plurality of adapter means being connected to the system bus; an adapter means transmitting to the local memory controller means to which it is connected memory access request signals received from the system bus addressed to the local memory means connected to the local memory controller means connected to the adapter means;

a local memory controller means receiving memory access request signals from the local bus or from the adapter means to which a local memory controller means is connected, which memory access request signals are addressed to the local memory means connected to that local memory controller means, executing the memory request signals by producing memory control signals and applying the memory control signals to the local memory means connected thereto, the memory control signals causing the addressed local memory means to execute the requested memory transaction; and a local memory controller receiving memory access request signals from the local bus addressed to the system memory means, transmitting the memory access request signals to the adapter means connected thereto, the adapter means applying the memory access request signals received from the local memory controller to the system bus.

2. A data processing system as set for in claim 1 in which each one of the plurality of local memory controller means includes priority means for assigning a priority to memory access request signals received by a local memory controller means which signals are waiting execution by the local memory controller means, the local memory controller means executing the waiting memory access request signals assigned the highest priority by the priority means.

3. A data processing system as set forth in claim 2 in which there are two local memory controller means, two local memory means, two adapter means, and two local processor means.

4. A data processing system as set forth in claim 3 in which memory access request signals from the system processor means waiting execution by a local memory controller means are assigned a higher priority than memory access request signals from the two local processors means.

5. A data processing system as set forth in claim 4 in which one of the two local processor means is associated with one of the local controller means and the second local processor is associated with the second local memory controller means, and a local controller means transmits to the adapter means connected to the local memory controller means, only memory access request signals addressed to the system memory means from the local processor means with which the local memory controller is associated.

6. In a data processing system having a single system bus for transmitting signals applied to the system bus; a system processor connected to the system bus for applying to the system bus memory request signals addressed to a memory; and a system memory having an address connected to the system bus, the system memory upon receiving memory request signals addressed to the system memory from the system bus executing a memory transaction requested by the memory request signals; wherein the improvements comprise:

a single local bus for transmitting signals applied to the local bus;

a first local processor and a second local processor connected to the local bus, the first local processor and the second local processor applying to the local bus memory request signals addressed to a memory;

a first local memory controller and a second local memory controller connected to the local bus for receiving memory request signals from the local bus;

a first local memory and a second local memory, the first local memory having an address and being connected to the first local memory controller and the second local memory having an address and being connected to the second local memory controller;

a first adapter and a second adapter, the first adapter being connected to the first local memory controller and to the system bus, and the second adapter being connected to the second local memory controller and to the system bus, the first adapter transmitting to the first local memory controller memory request signals addressed to the first local memory received by the first adapter from the system bus, the second adapter transmitting to the second local memory controller memory request signals addressed to the second local memory received by the second adapter from the system bus;

the first local memory controller upon receiving memory request signals addressed to the first local memory from the local bus or the first adapter executing the memory request signals by producing memory control signals and applying the memory control signals to the first local memory, which memory control signals cause the first local memory to execute a requested memory transaction; the second local memory controller upon receiving memory request signals addressed to the second local memory from the local bus or the second adapter executing the memory request signals by producing memory control signals and applying the memory control signals to the second local memory, which memory control signals cause the second local memory to execute a requested memory transaction; the first local memory controller upon receiving memory request signals from the first local processor addressed to the system memory transmitting the memory request signals to the first adapter and the first adapter applying the memory request signals to the system bus; and the second local memory controller upon receiving memory request signals from the local processor addressed to the system memory transmitting the memory request signals to the second adapter and the second adapter applying the memory request signals to the system bus.

7. In a data processing system as set forth in claim 6 in which the first local memory controller includes a first priority circuit and the second local memory controller includes a second priority circuit, the first priority circuit assigning a priority to memory request signals received by the first local memory controller addressed to the first local memory waiting execution by the first local memory controller, the first local memory controller executing the waiting memory request signals assigned the highest priority by the first priority circuit; and in which the second local memory controller includes a second priority circuit, the second priority circuit assigning a priority to memory request signals received by the second local memory controller addressed to the second local memory waiting execution by the second local memory controller, the second local memory controller executing the waiting memory request signals assigned the highest priority by the second priority circuit.

8. In a data processing system as set forth in claim 7 in which waiting memory request signals received by a local memory controller from the adapter to which the local memory controller is connected are assigned a higher priority by the priority circuit of the local memory controller than waiting memory request signals from the first local processor and the second local processor.

9. In a data processing system as set forth in claim 8 in which memory request signals from the first local processor waiting execution by the first local memory controller are assigned the lowest priority by the first priority circuit, and in which memory request signals from the second local processor waiting execution by the second local memory controller are assigned the lowest priority by the second priority circuit.

10. A data processing system comprising:
a system bus, the system bus transmitting signals applied by system means connected thereto to system means connected to the system bus;
system processor means connected to the system bus for applying memory access request signals to the system bus, which memory access request signals include address signals identifying an address of a memory location in a memory means, the addressed memory means, and signals identifying a memory transaction to be executed by the addressed memory means;
system memory means being connected to the system bus, the system memory means having a range of addresses of memory locations in the system memory means, the system memory means executing a requested memory transaction upon the receipt from the system bus of memory access request signals including the address of a memory location in the system memory means;
a local bus, the local bus transmitting signals applied by local means connected thereto to local means connected to the local bus;
"n" local processor means connected to the local bus, where "n" is an integer greater than one, each one of the "n" local processor means applying to the local bus memory access request signals;
"n" local memory controller means, each one of the "n" local memory controller means being connected to the local bus, and each one of the "n" local memory controller means being associated with a different one of the "n" local processor means, a local memory controller means executing memory access request signals by producing memory control signals;
"n" local memory means, each one of the "n" local memory means being connected to a different one of the "n" local memory controller means, each one of the "n" local memory means having a range of addresses of memory locations, and each one of the "n" local memory means executing a memory transaction upon receiving memory control signals;
"n" system adapter means, each one of the "n" system adapter means being connected to a different one of the "n" local memory controller means, with each one of the "n" system adapter means also being connected to the system bus; each one of the "n" system adapter means transmitting to the local memory controller means to which a system adapter means is connected, memory access request signals received by the system adapter means from the system bus which memory access request signals include the address of a memory location in the local memory means connected to the local memory controller means;
each one of the "n" local memory controller means upon receiving memory access request signals including the address of a memory location in the local memory means connected thereto from the local bus or from the system adapter means to which a local memory controller means is connected for executing the memory access signals and applying to the local memory means to which the local memory controller means is connected memory control signals produced by the local memory controller, which memory control signals cause the addressed local memory means to execute the requested memory transaction; and each one of the "n" local memory controller means receiving memory access request signals from the local bus applied to the local bus by the local processor means associated with the memory controller means which memory access request signals include an address of a memory location in the system memory, that local memory controller means transmits such memory access request signals to the system adapter means connected to it and the system adapter means applies the memory access request signals to the system bus the receipt of the memory access request signals by the system memory means causing the system memory means to execute the requested memory transaction.

11. A data processing system as set forth in claim 10 in which "n" equals two.

* * * * *